US009352296B2

(12) United States Patent
Chakravarti et al.

(10) Patent No.: US 9,352,296 B2
(45) Date of Patent: May 31, 2016

(54) METHOD AND SYSTEM FOR PRODUCING A SYNTHESIS GAS USING AN OXYGEN TRANSPORT MEMBRANE BASED REFORMING SYSTEM WITH SECONDARY REFORMING

(71) Applicants: Shrikar Chakravarti, East Amherst, NY (US); Raymond Francis Drnevich, Clarence Center, NY (US); Minish M. Shah, East Amherst, NY (US); Ines C. Stuckert, East Amherst, NY (US)

(72) Inventors: Shrikar Chakravarti, East Amherst, NY (US); Raymond Francis Drnevich, Clarence Center, NY (US); Minish M. Shah, East Amherst, NY (US); Ines C. Stuckert, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/661,679

(22) Filed: Mar. 18, 2015

(65) Prior Publication Data
US 2015/0190776 A1 Jul. 9, 2015

Related U.S. Application Data

(62) Division of application No. 14/078,897, filed on Nov. 13, 2013.

(60) Provisional application No. 61/816,326, filed on Apr. 26, 2013.

(51) Int. Cl.
*C01B 3/26* (2006.01)
*B01J 19/24* (2006.01)
(Continued)

(52) U.S. Cl.
CPC ............. *B01J 19/2475* (2013.01); *C01B 3/26* (2013.01); *C01B 3/382* (2013.01); *C01B 3/384* (2013.01); *C01B 3/386* (2013.01); *C01B 13/0251* (2013.01); *B01J 2219/00051* (2013.01); *B01J 2219/00157* (2013.01); *B01J 2219/24* (2013.01); *C01B 2203/0233* (2013.01); *C01B 2203/0244* (2013.01); *C01B 2203/0261* (2013.01); *C01B 2203/04* (2013.01); *C01B 2203/0495* (2013.01);
(Continued)

(58) Field of Classification Search
CPC .......... C01B 3/26; C01B 3/386; C01B 3/382; C01B 3/384; C01B 13/0251; C01B 2203/04; C01B 2203/0495; C01B 2203/0838; C01B 2203/0883; C01B 2203/1205
See application file for complete search history.

(56) References Cited

U.S. PATENT DOCUMENTS

| 4,650,814 A | 3/1987 | Keller |
| 5,975,130 A | 11/1999 | Ligh et al. |

(Continued)

FOREIGN PATENT DOCUMENTS

| EP | 0 926 096 A1 | 6/1999 |
| EP | 0 984 500 A2 | 3/2000 |

(Continued)

OTHER PUBLICATIONS

Friedemann Marschner et al., "Gas Production", Ullmann's Encyclopedia of Industrial Chemistry, Jun. 15, 2000, pp. 1-21, XP002253967.

(Continued)

*Primary Examiner* — Matthew Merkling
(74) *Attorney, Agent, or Firm* — Ralph J. Mancini

(57) ABSTRACT

A method and system for producing a synthesis gas in an oxygen transport membrane based reforming system is disclosed that carries out a primary reforming process, a secondary reforming process.

6 Claims, 1 Drawing Sheet

(51) Int. Cl.
*C01B 3/38* (2006.01)
*C01B 13/02* (2006.01)

(52) U.S. Cl.
CPC . *C01B 2203/0838* (2013.01); *C01B 2203/0883* (2013.01); *C01B 2203/1205* (2013.01); *C01B 2203/127* (2013.01); *C01B 2203/142* (2013.01); *C01B 2203/80* (2013.01)

(56) References Cited

U.S. PATENT DOCUMENTS

| | | | |
|---|---|---|---|
| 6,048,472 A | | 4/2000 | Nataraj et al. |
| 6,110,979 A | | 8/2000 | Nataraj et al. |
| 6,114,400 A | | 9/2000 | Nataraj et al. |
| 6,139,810 A | * | 10/2000 | Gottzmann et al. .......... 422/608 |
| 6,214,314 B1 | | 4/2001 | Abbott |
| 6,293,084 B1 | | 9/2001 | Drnevich et al. |
| 6,296,686 B1 | | 10/2001 | Prasad et al. |
| 6,382,958 B1 | | 5/2002 | Bool, III et al. |
| 6,394,043 B1 | | 5/2002 | Bool, III et al. |
| 6,562,104 B2 | | 5/2003 | Bool, III et al. |
| 7,261,751 B2 | | 8/2007 | Dutta et al. |
| 7,470,811 B2 | | 12/2008 | Thiebaut |
| 7,786,180 B2 | | 8/2010 | Fitzpatrick |
| 7,856,829 B2 | | 12/2010 | Shah et al. |
| 8,196,387 B2 | | 6/2012 | Shah et al. |
| 8,262,755 B2 | | 9/2012 | Repasky et al. |
| 8,349,214 B1 | | 1/2013 | Kelly et al. |
| 8,419,827 B2 | | 4/2013 | Repasky et al. |
| 2003/0039601 A1 | * | 2/2003 | Halvorson et al. ............ 422/198 |
| 2003/0039608 A1 | | 2/2003 | Shah et al. |
| 2004/0221722 A1 | | 11/2004 | Prasad et al. |
| 2005/0037299 A1 | * | 2/2005 | Gottzmann ....................... 431/1 |
| 2007/0041894 A1 | | 2/2007 | Drnevich |
| 2007/0289215 A1 | | 12/2007 | Hemmings et al. |
| 2007/0292342 A1 | | 12/2007 | Hemmings et al. |
| 2008/0000350 A1 | * | 1/2008 | Mundschau et al. .............. 95/56 |
| 2008/0141672 A1 | | 6/2008 | Shah et al. |
| 2008/0169449 A1 | * | 7/2008 | Mundschau .................. 252/373 |
| 2008/0302013 A1 | | 12/2008 | Repasky et al. |
| 2009/0120379 A1 | | 5/2009 | Bozzuto et al. |
| 2011/0076213 A1 | | 3/2011 | Carolan et al. |
| 2011/0120127 A1 | * | 5/2011 | Lippmann et al. .............. 60/647 |
| 2011/0142722 A1 | | 6/2011 | Hemmings et al. |
| 2011/0240924 A1 | | 10/2011 | Repasky |
| 2013/0009102 A1 | | 1/2013 | Kelly et al. |
| 2014/0183866 A1 | | 7/2014 | Kromer et al. |
| 2014/0319424 A1 | | 10/2014 | Chakravarti et al. |
| 2014/0319427 A1 | | 10/2014 | Chakravarti et al. |
| 2014/0323598 A1 | | 10/2014 | Chakravarti et al. |

FOREIGN PATENT DOCUMENTS

| | | |
|---|---|---|
| EP | 0 989 093 A2 | 3/2000 |
| EP | 1 504 811 A1 | 2/2005 |
| WO | WO 2013/062413 A1 | 5/2013 |
| WO | WO 2014/107707 A2 | 7/2014 |
| WO | WO 2014/176022 A1 | 10/2014 |

OTHER PUBLICATIONS

Lee Rosen, Nick Degenstein; Minish Shah; Jamie Wilson; Sean Kelly; John Peck; and Max Christie; "Development of Oxygen Transport Membranes for Coal-Based Power Generation"; ScienceDirect (Available online at www.sciencedirect.com); Energy Procedia 4 (2011) pp. 750-755.

* cited by examiner

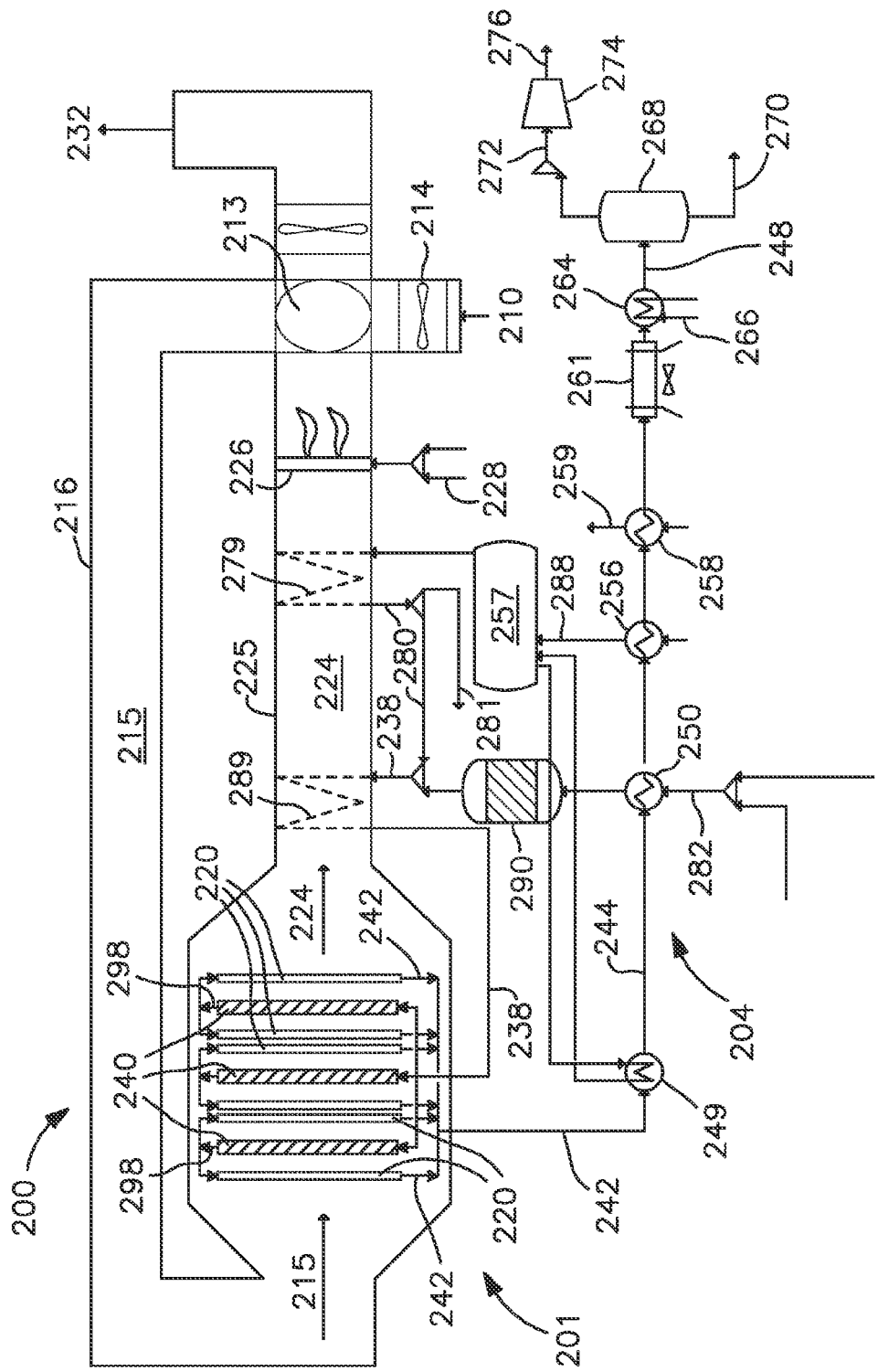

METHOD AND SYSTEM FOR PRODUCING A SYNTHESIS GAS USING AN OXYGEN TRANSPORT MEMBRANE BASED REFORMING SYSTEM WITH SECONDARY REFORMING

CROSS REFERENCE TO RELATED APPLICATIONS

This application is a divisional of U.S. patent application Ser. No. 14/078,897 and claims priority to and the benefit of U.S. provisional patent application Ser. No. 61/816,326 filed on Apr. 26, 2013, the disclosure of which is incorporated by reference herein.

FIELD OF THE INVENTION

The present invention relates to a method and system for producing a synthesis gas in an oxygen transport membrane based reforming system, and more particularly, a method and system for producing a synthesis gas with very low methane slip in an oxygen transport membrane based reforming system that provides both primary and secondary reforming.

BACKGROUND

Synthesis gas containing hydrogen and carbon monoxide is produced for a variety of industrial applications, for example, the production of hydrogen, chemicals and synthetic fuel production. Conventionally, the synthesis gas is produced in a fired reformer in which natural gas and steam is reformed in nickel catalyst containing reformer tubes at high temperatures (e.g., 850° C. to 1000° C.) and moderate pressures (e.g., 16 to 30 bar) to produce the synthesis gas. The endothermic heating requirements for steam methane reforming reactions occurring within the reformer tubes are provided by burners firing into the furnace that are fueled by part of the natural gas. In order to increase the hydrogen content of the synthesis gas produced by the steam methane reforming (SMR) process, the synthesis gas can be subjected to water-gas shift reactions to react residual steam in the synthesis gas with the carbon monoxide.

A well established alternative to steam methane reforming is the non-catalytic partial oxidation process (POx) whereby a substoichiometric amount of oxygen is allowed to react with the natural gas feed creating steam and carbon dioxide at high temperatures. The high temperature residual methane is reformed through reactions with the high temperature steam and carbon dioxide.

An attractive alternative process for producing synthesis gas is the autothermal reformer (ATR) process which uses oxidation to produce heat with a catalyst to permit reforming to occur at lower temperatures than the POx process. Similar to the POx process, oxygen is required to partially oxidize natural gas in a burner to provide heat, high temperature carbon dioxide and steam to reform the residual methane. Normally some steam needs to be added to the natural gas to control carbon formation on the catalyst. However, both the ATR as well as POx processes require separate air separation units (ASU) to produce high-pressure oxygen, which adds complexity as well as capital and operating cost to the overall process.

When the feedstock contains significant amounts of heavy hydrocarbons, SMR and AIR processes, are typically preceded by a pre-reforming step. Pre-reforming is a catalyst based process for converting higher hydrocarbons to methane, hydrogen, carbon monoxide and carbon dioxide. The reactions involved in pre-reforming are endothermic. Most prereformers operate adiabatically, and thus the pre-reformed feedstock leaves at a much lower temperature than the feedstock entering the pre-reformer. Another process that will be discussed in this invention is the secondary reforming process, which is essentially an autothermal process that is fed the product from a steam methane reforming process. Thus, the feed to a secondary reforming process is primarily synthesis gas from steam methane reforming. Depending on the end application, some natural gas may bypass the SMR process and be directly introduced into the secondary reforming step. Also, when a SMR process is followed by a secondary reforming process, the SMR may operate at a lower temperature, e.g. 650° C. to 825° C. versus 850° C. to 1000° C.

As can be appreciated, the conventional methods of producing a synthesis gas such as have been discussed above are expensive and require complex installations. To overcome the complexity and expense of such installations it has been proposed to generate the synthesis gas within reactors that utilize an oxygen transport membrane to supply oxygen and thereby generate the heat necessary to support endothermic heating requirements of the steam methane reforming reactions. A typical oxygen transport membrane has a dense layer that, while being impervious to air or other oxygen containing gas, will transport oxygen ions when subjected to an elevated operational temperature and a difference in oxygen partial pressure across the membrane.

Examples of oxygen transport membrane based reforming systems used in the production of synthesis gas can be found in U.S. Pat. Nos. 6,048,472; 6,110,979; 6,114,400; 6,296,686; 7,261,751; 8,262,755; and 8,419,827. There is an operational problem with all of these oxygen transport membrane based systems because such oxygen transport membranes need to operate at high temperatures of around 900° C. to 1100° C. Where hydrocarbons such as methane and higher order hydrocarbons are subjected to such high temperatures within the oxygen transport membrane, excessive carbon formation occurs, especially at high pressures and low steam to carbon ratios. The carbon formation problems are particularly severe in the above-identified prior art oxygen transport membrane based systems. A different approach to using an oxygen transport membrane based reforming system in the production of synthesis gas is disclosed in U.S. Pat. No. 8,349,214 which provides a oxygen transport membrane based reforming system that uses hydrogen and carbon monoxide as part of the reactant gas feed to the oxygen transport membrane tubes and minimizes the hydrocarbon content of the feed entering the permeate side of the oxygen transport membrane tubes. Excess heat generated within the oxygen transport membrane tubes is transported mainly by radiation to the reforming tubes made of conventional materials. Use of low hydrocarbon content high hydrogen and carbon monoxide feed to the oxygen transport membrane tubes addresses many of the highlighted problems with the earlier oxygen transport membrane systems.

Other problems that arise with the prior art oxygen transport membrane based reforming systems are the cost of the oxygen transport membrane modules and the lower than desired durability, reliability and operating availability of such oxygen transport membrane based reforming systems. These problems are the primary reasons that oxygen transport membranes based reforming systems have not been successfully commercialized. Advances in oxygen transport membrane materials have addressed problems associated with oxygen flux, membrane degradation and creep life, but there is much work left to be done to achieve commercially viable oxygen transport membrane based reforming systems from a cost standpoint as well as from an operating reliability and availability standpoint.

The present invention addresses the aforementioned problems by providing an improved process for making synthesis gas using a reactively-driven oxygen transport membrane based system, which consists of two reactors that can be in the form of sets of catalyst containing tubes—reforming reactor and oxygen transport membrane reactor. Partial oxidation and some reforming occurs at the permeate (catalyst containing) side of the oxygen transport membranes and a reforming process facilitated by a reformer catalyst occurs in the reforming reactor in close proximity to the oxygen transport membrane reactor. The partial oxidation process, which is exothermic, and the reforming process, which is endothermic, both occur within the oxygen transport membrane based system and thus have a high degree of thermal integration so that heat released in the oxidation process supplies the heat absorbed by the reforming process.

Specifically, the improvements to the reactively-driven oxygen transport membrane based system include modifications to the reactively-driven oxygen transport membrane based system to carry out both a primary reforming process in a catalyst filled reforming reactor as well as a secondary reforming process within the catalyst containing oxygen transport membrane reactor.

Additional improvements to the reactively-driven oxygen transport membrane based system include modifications to the steam and hydrocarbon feed stream and downstream conditioning of the synthesis gas. In addition, using a reactively driven oxygen transport membrane reactor with hydrogen and carbon-monoxide as a portion of the feed produces a higher oxygen flux compared to reactively-driven oxygen transport membranes that use only steam-methane feed The actual difference in flux performance is a function of pressure, temperature, and reactant gas concentrations. Finally, some modifications or changes are proposed to the heat recovery train to mitigate metal dusting and carbon formation issues that adversely impact system performance, reliability and durability of the system.

SUMMARY OF THE INVENTION

The present invention may be characterized as a method for producing a synthesis gas in an oxygen transport membrane based reforming system, which consists of two reactors that can be in the form of sets of catalyst containing tubes—reformer reactor and oxygen transport membrane reactor, the method comprising the steps of: (i) partially reforming a combined feed stream comprising a hydrocarbon containing feed stream and steam in the presence of heat in a reforming reactor to produce a partially reformed synthesis gas stream comprising hydrogen, carbon monoxide, and unreformed hydrocarbon gas; (ii) feeding the partially reformed synthesis gas stream to a reactant side of a reactively driven and catalyst containing oxygen transport membrane reactor, wherein the oxygen transport membrane reactor includes at least one oxygen transport membrane element; (iii) reacting a portion of partially reformed synthesis gas stream with oxygen permeated through the at least one oxygen transport membrane element to produce the difference in oxygen partial pressure across the at least one oxygen transport membrane element and generate a steam containing heated reaction product stream and heat; (iv) transferring some of the heat generated as a result of the reaction to the gas in the catalyst containing oxygen transport membrane reactor; some by radiation to the reforming reactor; and some by convection to the oxygen depleted stream; and (v) reforming of the unreformed hydrocarbon gas in the partially reformed synthesis gas stream in the presence of the one or more catalysts contained in the oxygen transport membrane reactor and the heat to produce a synthesis gas product stream.

The invention may also be characterized as an oxygen transport membrane based reforming system for producing synthesis gas comprising: (a) a reactor housing; (b) a plurality of catalyst containing and reactively driven oxygen transport membrane elements or tubes disposed in the reactor housing and configured to separate oxygen from an oxygen containing feed stream and produce an oxygen permeate at a permeate side of the oxygen transport membrane elements or tubes and an oxygen depleted stream, the catalysts disposed proximate the permeate side of the oxygen transport membrane tubes or elements; (c) a plurality of catalyst containing reformer tubes disposed in the reactor housing juxtaposed to the oxygen transport membrane elements or tubes.

The catalyst containing reformer tubes are configured to produce a partially reformed synthesis gas stream by reforming a hydrocarbon containing feed and steam in the presence of the catalyst contained in the reformer tubes and heat radiated from the juxtaposed oxygen transport membrane elements or tubes. The outlets of the catalyst containing reformer tubes are fluidically coupled to the permeate side of the plurality of oxygen transport membrane elements or tubes such that the partially reformed synthesis gas flows through the catalyst containing oxygen transport membrane elements or tubes.

The plurality of oxygen transport membrane elements or tubes are configured to separate oxygen from an oxygen containing feed stream and produce an oxygen permeate at a permeate side of the oxygen transport membrane elements or tubes and an oxygen depleted stream, the catalyst being disposed proximate the permeate side of the oxygen transport membrane elements. The oxygen transport membrane elements or tubes are configured to react hydrogen, carbon monoxide and methane in the partially reformed synthesis gas stream with the oxygen permeate at the permeate side of the oxygen transport membrane elements or tubes to reactively drive the separation of oxygen from the oxygen containing feed stream and to produce partial oxidation reaction products and heat. In addition, the oxygen transport membrane reactor is further configured to produce a synthesis gas product stream by the partial oxidation and by further reforming of the partially reformed synthesis gas stream fed to the permeate side of the oxygen transport membrane elements or tubes in the presence of one or more catalysts and the heat.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which FIG. 1 is a schematic illustration of an embodiment of an oxygen transport membrane based reforming system designed to carry out both a primary reforming process and a secondary reforming process within the oxygen transport membrane reactor.

DETAILED DESCRIPTION

FIG. 1 provides a schematic illustration of an embodiment of an oxygen transport membrane based reforming system 201 and assembly 200 in accordance with the present invention. As seen therein, an oxygen containing stream 210, such as air, is introduced to the system by means of a forced draft (FD) fan 214 into a heat exchanger 213 for purposes of preheating the oxygen containing feed stream 210. Heat exchanger 213 is preferably a high efficiency, cyclic continuously rotating ceramic regenerator disposed in operative association with the oxygen containing feed stream 210 and the heated retentate stream 224. The ceramic regenerator 213 which heats the incoming air feed stream 210 to a temperature in the range of about 500° C. to 1050° C.

The oxygen depleted air leaves the oxygen transport membrane reforming tubes as a heated retentate stream 224 at the same or slightly higher temperature than the heated air feed stream 215. Any temperature increase, typically <30° C., is attributable to the portion of energy generated by oxidizing reaction of hydrogen and carbon monoxide in the oxygen transport membrane tubes and transferred by convection to the air stream. The heated, oxygen depleted retentate stream 224 is first used to heat the mixed feed stream to a temperature between about 450° C. and 650° C., and more preferably to a temperature between 500° C. and 600° C., and is subsequently used to further heat steam to superheated steam.

The temperature of this oxygen depleted retentate stream 224 preferably needs to be then increased back to a temperature between about 1050° C. and 1200° C. prior to being directed to the ceramic heat exchanger or regenerator 213. This increase in temperature of the retentate stream 224 is preferably accomplished by use of a duct burner 226, which facilitates combustion of a supplemental fuel stream 228 using some of the residual oxygen in the retentate stream 224. It is conceivable that the mixed feed heater and steam superheater could alternatively be located in a separate fired heater (not shown). In that case, the fuel requirements of the duct burner 226 will be substantially less.

In the ceramic heat exchanger or regenerator 213, the heated, oxygen depleted retentate stream provides the energy to raise the temperature of the incoming feed air stream from ambient temperature to a temperature between about 850° C. to 1050° C. The resulting cold retentate stream exiting the ceramic heat exchanger, typically containing less than 5% oxygen, leaves the oxygen transport membrane based reforming system 201 system as exhaust gas 232 at a temperature of around 150° C.

The oxygen transport membrane based reforming system 201 comprises two reactors, which can be in the form of sets of catalyst containing tubes—reforming reactor and oxygen transport membrane reactor. The reforming reactor consists of reforming tubes 240 where the primary reforming occurs and oxygen transport membrane reactor consists of oxygen transport membrane tubes 220 where the secondary reforming occurs. Although only six secondary reforming oxygen transport membrane tubes 220 are illustrated in close proximity to three primary reforming tubes 240, as would occur to those skilled in the art, there could be many of such secondary reforming oxygen transport membrane tubes and many primary reforming tubes in each oxygen transport membrane sub-system. Likewise, there would be multiple oxygen transport membrane sub-systems used in an industrial application of the oxygen transport membrane based reforming system 201.

The heated oxygen containing stream 215 is directed via the intake duct 216 to a plurality of secondary reforming oxygen transport membrane tubes 220 incorporated into the oxygen transport membrane system 201. The secondary reforming oxygen transport membrane tubes 220 are preferably configured as multilayered ceramic tubes capable of conducting oxygen ions at an elevated operational temperature, wherein the oxidant side or retentate side of the secondary reforming oxygen transport membrane tubes 220 is the exterior surface of the ceramic tubes exposed to the heated oxygen containing stream 215 and the reactant side or permeate side is the interior surface of the ceramic tubes. Within each of the secondary reforming oxygen transport membrane tubes 220 are one or more catalysts that facilitate partial oxidation and reforming.

Although not shown, an alternate embodiment of the oxygen transport membrane based reforming system could dispose the duct burner 226 and supplemental fuel stream 228 upstream of the reactors in intake duct 216. Such arrangement would allow use of a smaller ceramic heat exchanger or regenerator 213 and less severe operating conditions for the ceramic heat exchanger or regenerator 213.

The hydrocarbon containing feed stream 292, preferably natural gas, to be reformed is typically mixed with a small amount of hydrogen or hydrogen-rich gas 293 and preheated to around 370° C. in heat exchanger 250 that serves as a pre-heater, as described in more detail below. Natural gas typically contains unacceptably high level of sulfur species and hydrogen is added to facilitate desulfurization. The heated feed stream 282 undergoes a sulfur removal process via device 290 such as hydro-treating to reduce the sulfur species to $H_2S$, which is subsequently removed in a guard bed using material like ZnO and/or CuO. The hydro-treating step also saturates any alkenes present in the hydrocarbon containing feed stream. Although not shown, the heated feed stream 282 may also undergo a pre-reforming step in an adiabatic pre-reformer, which converts higher hydrocarbons to methane, hydrogen, carbon monoxide, and carbon dioxide or a heated pre-reforming step. In the case of heated pre-reforming, it is contemplated that the catalyst based pre-reformer be thermally coupled with the oxygen transport membrane based reforming system.

Superheated steam 280 is added to the pre-treated natural gas and hydrogen feed stream, as required, to produce a mixed feed stream 238 with a steam to carbon ratio between about 1.0 and 2.5, and more preferably between about 1.2 and 2.2. The superheated steam 280 is preferably between about 15 bar and 80 bar and between about 300° C. and 600° C. and generated by means of indirect heat exchange with the heated retentate stream 224 using steam coils 279 disposed in the retentate duct 225. Any superheated steam 280 not added or used in the natural gas and hydrogen feed 282 is exported steam 281 used for power generation. The mixed feed stream 238 is heated, by means of indirect heat exchange with the heated retentate stream using coils 289 disposed in the retentate duct 225, to preferably between about 450° C. and 650° C., and more preferably between about 500° C. and 600° C.

The heated mixed feed stream 238 is then sent to the reforming tubes 240, which contain conventional reforming catalyst. The temperature of the partially reformed hydrogen-rich synthesis gas 298 leaving the reforming tubes 240 is typically designed to be between 650° C. and 850° C. This synthesis gas is then fed to the oxygen transport membrane tubes 220 filled with a reforming catalyst. Oxygen from the heated intake air permeates through the oxygen transport membrane tubes 220 and facilitates reaction of a portion of the partially reformed synthesis gas 298. A portion of the energy or heat generated by this reaction is used for in-situ secondary reforming of the residual methane in the partially reformed synthesis gas 298. The rest of the energy or heat is transferred by radiation to the reforming tubes 240 to drive the primary reforming reactions and by convection to the oxygen-depleted stream 224. The synthesis gas 242 leaving the oxygen transport membrane tubes 220, which essentially function as a secondary reformer, is at a temperature between about 900° C. and 1050° C.

The endothermic heating requirements of the reforming process occurring in the primary reforming tubes 240 is supplied through radiation of some of the heat from the secondary reforming oxygen transport membrane tubes 220 together with the convective heat transfer provided by heated retentate stream 224. In addition, as the heated, oxygen depleted retentate stream 224 exits the oxygen transport membrane based reforming system 201, it also heats the mixed feed stream 238 to a temperature between about 450° C. and 650° C. via indirect heat transfer using one or more coils 289 disposed in the retentate stream duct 225.

Sufficient thermal coupling or heat transfer between the heat-releasing ceramic oxygen transport membrane tubes and the heat-absorbing catalyst containing reformer tubes must be enabled within the design of the present reactor system. A portion of the heat transfer between the ceramic oxygen transport membrane tubes and the adjacent catalyst containing reformer tubes is through the radiation mode of heat transfer whereby surface area, surface view factor, surface emissivity, and non-linear temperature difference between the tubes, i.e. $T_{otm}^4 - T_{reformer}^4$, are critical elements to achieve the desired thermal coupling. Surface emissivity and temperatures are generally dictated by tube material and reaction requirements. The surface area and radiation view factor are generally dictated by tube arrangement or configuration within each module and the entire reactor. While there are numerous tube arrangements or configurations that could meet the thermal coupling requirements between the oxygen transport membrane tubes and the reformer tubes, a key challenge is to achieve a relatively high production rate per unit volume which, in turn, depends on the amount of active oxygen transport membrane area contained within the unit volume. In the present embodiments, the preferred view factor between the oxygen transport membrane tubes radiating heat to the catalyst containing reformer tubes is greater than or equal to about 0.4.

It is to be noted that the term "view factor" is the quantity known in the art that defines the fraction of the total energy leaving a surface that reaches another surface. The view factor is employed in an equation that is used to determine radiant heat transfer. This equation, well known in the art, is:

$$q_{12} = \epsilon \sigma A_2 F_{21}(T_1^4 - T_2^4);$$

where $q_{12}$ is the radiant heat transfer between surface 1 and 2, $\epsilon$ is the emissivity, $\sigma$ is Stefan Boltzmann constant, $A_2$ is the area of surface 2, $F_{21}$ is the view factor from surface 2 to surface 1, $T_1$ is the absolute temperature of surface 1 and $T_2$ is the absolute temperature of surface 2.

An additional challenge to achieving the optimum thermal coupling performance is to optimize the size of the ceramic oxygen transport membrane tubes and the catalyst containing reformer tubes, and more particular the effective surface area ratio, $A_{reformer}/A_{otm}$, of the respective tubes. Of course, such performance optimization must be balanced against the manufacturability requirements, costs, as well as the reliability, maintainability, operating availability of the modules and reactor. Preferably, the area ratio, $A_{reformer}/A_{otm}$ of the catalyst containing reformer tubes and catalyst containing oxygen transport membrane tubes radiating heat to the reformer tubes in the present embodiments is between about 0.5 and 1.0.

Turning back to FIG. 1, the synthesis gas stream 242 produced by the oxygen transport membrane based reforming system 201 generally contains hydrogen, carbon monoxide, unconverted methane, steam, carbon dioxide and other constituents. A significant portion of the sensible heat from the synthesis gas stream 242 can be recovered using a heat exchange section or recovery train 204. Heat exchange section 204 is designed to cool the produced synthesis gas stream 242 exiting the oxygen transport membrane based reforming system 201. In this illustrated embodiment, the heat exchange section 204 is also designed such that in cooling the synthesis gas stream 242, process steam is generated, hydrocarbon feed stream is preheated, and boiler feed water and feedwater are heated.

To minimize metal dusting issues, the hot synthesis gas 242 is directly cooled to about 400° C. or less in a Process Gas (PG) Boiler 249. The initially cooled synthesis gas stream 244 is then used to preheat the mixture of natural gas and hydrogen feed stream 282 in a fuel pre-heater 250 and subsequently to pre-heat boiler feed water 288 in the economizer 256 and to heat the feed water stream 259. In the illustrated embodiment, the boiler feed water stream 288 is preferably pumped using a feed water pump (not shown), heated in economizer 256 and sent to steam drum 257 while the heated feed water 259 is sent to a de-aerator (not shown) that provides boiler feed water 288. Synthesis gas leaving the feedwater heater 258 is preferably around 150° C. It is cooled down to 40° C. using a fin-fan cooler 261 and a synthesis gas cooler 264 fed by cooling water 266. The cooled synthesis gas 248 then enters a knock-out drum 268 where water is removed from the bottoms as process condensate stream 270 which, although not shown, is recycled for use as feedwater, and the cooled synthesis gas 272 is recovered overhead.

The cooled synthesis gas stream 272 is optionally compressed in a synthesis gas compressor 274 to produce a synthesis gas product 276. Depending on the operating pressure of the oxygen transport membrane based reforming system, pressure of the recovered synthesis gas is preferably in the range of about 10 bar and 35 bar and more preferably in the range of 12 bar and 30 bar. The module of the synthesis gas produced in the described embodiment is typically less than about 2.0 and often less than about 1.9, whereas for some synthesis gas applications such as methanol synthesis, the desired module of the synthesis gas is preferably in the range of about 2.0 to 2.2. Use of an adiabatic pre-reformer upfront of the OTM reactor can increase the module by about 0.05 to 0.1 relative to the configuration without a pre-reformer. With a heated pre-reformer, it becomes possible to achieve higher modules, preferably greater than 2 and definitely greater than 1.9. The exact module value depends on the operating temperature.

The oxygen transport membrane elements or tubes used in the embodiments disclosed herein preferably comprise a composite structure that incorporates a dense layer, a porous support and an intermediate porous layer located between the dense layer and the porous support. Each of the dense layer and the intermediate porous layer are capable of conducting oxygen ions and electrons at elevated operational temperatures to separate the oxygen from the incoming air stream. The porous support layer would thus form the reactant side or permeate side. The dense layer and the intermediate porous layer preferably comprise a mixture of an ionic conductive material and an electrically conductive material to conduct oxygen ions and electrons, respectively. The intermediate porous layer preferably has a lower permeability and a smaller average pore size than the porous support layer to distribute the oxygen separated by the dense layer towards the porous support layer.

In the preferred embodiments, the oxygen transport membrane tubes include a mixed phase oxygen ion conducting dense ceramic separation layer comprising a mixture of a zirconia based oxygen ion conducting phase and a predominantly electronic conducting perovskite phase. This thin, dense separation layer is implemented on a thicker inert, porous support. The intermediate porous layer can have a thickness of between about 10 microns and about 40 microns, a porosity of between about 25 percent and about 40 percent and an average pore diameter of between about 0.5 microns and about 3 microns. The dense layer can have a thickness of between about 10 microns and about 30 microns. The porous surface exchange layer can be provided with a thickness of between about 10 microns and about 40 microns, a porosity of between about 30 percent and about 60 percent and a pore diameter of between about 1 microns and about 4 microns and the support layer can have a thickness of between about 0.5 mm and about 10.0 mm, but preferably 0.9 mm and a pore size no greater than 50 microns. The intermediate porous layer can contain a ceramic mixture of about 60 percent by weight of $(La_{0.825}Sr_{0.175})_{0.96}$ $Cr_{0.76}Fe_{0.225}V_{0.015}O_{3-\delta}$, remainder 10Sc1YSZ, whereas the dense layer can be formed of a ceramic mixture of about 40 percent by weight of $(La_{0.825}Sr_{0.175})_{0.94}Cr_{0.72}Mn_{0.26}V_{0.02}O_{3-x}$, remainder 10Sc1YSZ and the porous surface exchange layer can be formed by a ceramic mixture of about 50 percent by weight of $(La_{0.8}Sr_{0.2})_{0.98}MnO_{3-\delta}$, remainder 10Sc1CeSZ.

Oxidation catalyst particles or a solution containing precursors of the oxidation catalyst particles are optionally located in the intermediate porous layer and in the thicker inert, porous support adjacent to the intermediate porous layer. The oxidation catalyst particles contain an oxidation catalyst selected to promote oxidation of the partially reformed synthesis gas stream in the presence of the permeated oxygen when introduced into the pores of the porous support, on a side thereof opposite to the intermediate porous layer. The oxidation catalyst can be gadolinium doped ceria. Further, a porous surface exchange layer can be provided in contact with the dense layer opposite to the intermediate porous layer. In such case, the porous surface exchange layer would form the retentate side. The support layer is preferably formed from a fluorite structured material, for example 3 mol % yttria stabilized zirconia, or 3YSZ.

While the present invention has been characterized in various ways and described in relation to preferred embodiments, as will occur to those skilled in the art, numerous, additions, changes and modifications thereto can be made without departing from the spirit and scope of the present invention as set forth in the appended claims.

What is claimed is:

1. An oxygen transport membrane based reforming system for producing synthesis gas comprising:
   a reactor housing;
   a plurality of catalyst containing and reactively driven oxygen transport membrane elements or tubes disposed in the reactor housing and configured to separate oxygen from an oxygen containing feed stream and produce an oxygen permeate at a permeate side of the oxygen transport membrane elements or tubes and an oxygen depleted stream, wherein one or more catalysts are disposed proximate the permeate side of the oxygen transport membrane tubes or elements;
   a plurality of catalyst containing reformer tubes disposed in the reactor housing juxtaposed to the oxygen transport membrane elements or tubes, the catalyst containing reformer tubes configured to produce a partially reformed synthesis gas stream by reforming a hydrocarbon containing feed and steam in the presence of the catalyst contained in the reformer tubes and heat radiated from the juxtaposed oxygen transport membrane elements or tubes;
   wherein an outlet of the catalyst containing reformer tubes is fluidically coupled to the permeate side of the oxygen transport membrane elements or tubes such that the partially reformed synthesis gas flows through the oxygen transport membrane elements or tubes,
   wherein hydrogen, carbon monoxide and methane in the partially reformed synthesis gas reacts with the oxygen permeate at the permeate side of the oxygen transport membrane elements or tubes to reactively drive the separation of oxygen from the oxygen containing feed stream and to produce partial oxidation reaction products and heat; and
   wherein the oxygen transport membrane elements and tubes are further configured to produce a synthesis gas product stream by the partial oxidation and by further reforming of the partially reformed synthesis gas stream fed to the permeate side of the oxygen transport membrane elements or tubes in the presence of the one or more catalyst(s) and the heat.

2. The oxygen transport membrane based reforming system of claim 1 further comprising a synthesis gas cooling subsystem configured to cool the synthesis gas product stream to a temperature of about 400° C. or less.

3. The oxygen transport membrane based reforming system of claim 1 further comprising a duct burner disposed within or proximate to the oxygen transport membrane based reforming system housing and configured to combust a supplemental fuel stream and residual oxygen in the oxygen depleted stream to heat the oxygen containing feed stream via indirect heat exchange.

4. The oxygen transport membrane based reforming system of claim 1 wherein said oxygen transport membrane elements or tubes contain one or more catalysts that facilitate partial oxidation and reforming.

5. The oxygen transport membrane based reforming system of claim 4 wherein said oxygen transport membrane elements or tubes contain oxidation catalyst.

6. The oxygen transport membrane based reforming system of claim 5 wherein said oxygen transport membrane elements contain reforming catalyst.

* * * * *